(12) United States Patent
Buschjohann et al.

(10) Patent No.: US 8,132,821 B2
(45) Date of Patent: Mar. 13, 2012

(54) AXLE BRACKET FOR MOTOR VEHICLE

(75) Inventors: Thomas Buschjohann, Nordstemmen (DE); Heiko Kauert, Blankenfelde (DE)

(73) Assignee: KSM Castings GmbH, Hildesheim (DE)

( * ) Notice: Subject to any disclaimer, the term of this patent is extended or adjusted under 35 U.S.C. 154(b) by 0 days.

(21) Appl. No.: 12/448,334

(22) PCT Filed: Dec. 27, 2007

(86) PCT No.: PCT/DE2007/002315
§ 371 (c)(1),
(2), (4) Date: Jun. 17, 2009

(87) PCT Pub. No.: WO2008/080387
PCT Pub. Date: Jul. 10, 2008

(65) Prior Publication Data
US 2010/0066048 A1    Mar. 18, 2010

(30) Foreign Application Priority Data
Dec. 29, 2006 (DE) .......... 10 2006 062 524
Jan. 2, 2007 (DE) .......... 10 2007 001 015

(51) Int. Cl.
*B60G 7/02* (2006.01)
(52) U.S. Cl. .............. 280/124.109
(58) Field of Classification Search ........... 280/124.109
See application file for complete search history.

(56) References Cited

U.S. PATENT DOCUMENTS

| | | | |
|---|---|---|---|
| 4,930,804 A | 6/1990 | Tattermusch et al. | |
| 5,280,957 A | 1/1994 | Hentschel et al. | |
| 5,918,893 A | 7/1999 | Marquardt et al. | |
| 7,048,286 B2 | 5/2006 | Eppelein | |
| 7,575,250 B2 * | 8/2009 | Werner et al. | 280/781 |
| 7,594,559 B2 * | 9/2009 | Kitoh et al. | 180/232 |

FOREIGN PATENT DOCUMENTS

| | | |
|---|---|---|
| CN | 2846260 | 12/2006 |
| DE | 43 22 717 | 1/1995 |
| DE | 197 01 367 | 7/1998 |
| DE | 101 33 424 | 1/2003 |
| EP | 0 794 106 | 9/1997 |
| EP | 0 816 139 | 1/1998 |
| WO | WO 2004/028882 | 4/2004 |
| WO | WO 2007/031059 | 3/2007 |

OTHER PUBLICATIONS

International Search Report.

\* cited by examiner

*Primary Examiner* — Eric Culbreth
(74) *Attorney, Agent, or Firm* — Collard & Roe, P.C.

(57) ABSTRACT

The invention relates to an axle bracket for the rear axle of a motor vehicle, as an assembled structural unit comprising a single profiled transversal carrier (1) and consoles (2, 3) fixed to the end regions of the structural unit. Said consoles are each provided with molded binding positions (A, B; C, D; E; F; G, H) for at least three of the following units—the upper transverse links (6), the lower transverse links (4), the track rods (5), and the spring or damping unit (7)—and each comprise at least two molded binding positions (G, H) for attaching the axle bracket to the bodywork.

32 Claims, 5 Drawing Sheets

AXLE BRACKET FOR MOTOR VEHICLE

CROSS REFERENCE TO RELATED APPLICATIONS

This application is the National Stage of PCT/DE2007/002315 filed on Dec. 27, 2007, which claims priority under 35 U.S.C. §119 of German Application No. 10 2006 062 524.2 filed on Dec. 29, 2006 and German Application No. 10 2007 001 015.1 filed on Jan. 2, 2007. The international application under PCT article 21(2) was not published in English.

The invention relates to an axle bracket or an auxiliary frame, also termed a subframe, for the rear axle of vehicles, which can be used for motor vehicles with a non-driven rear axle and also accordingly adapted or constructed, for vehicles with a driven rear axle.

Such auxiliary frames, also termed subframes, supporting frames or rear axle brackets, have become known for example through DE 101 33 424 A1 for the formation of a so-called five-link axle with at least two transverse links articulated above the wheel centre and two below the wheel centre and with the track rod as the fifth link. Here, the axle bracket itself consists of two hollow longitudinal beams and two hollow transverse beams which are welded together and have connection points for the above-mentioned units. Both the production of the beams per se is complex and expensive, likewise the welding together and also the mounting and forming of the connection points for the various units.

The present invention was based on the problem of avoiding these disadvantages and producing such axle brackets at a more favourable cost and more simply, both with regard to the number of individual parts from which it is composed and also with regard to these individual parts themselves and also with regard to the formation of the connection points. In addition, it was based on the problem of saving weight and increasing the rigidity.

The axle bracket according to the present invention is distinguished accordingly in that it is constructed as an assembled structural unit with a single profiled transverse carrier with consoles fastened to its end regions, which are provided with in each case formed-on connection points for at least three of the units listed below:
  the upper transverse links
  the lower transverse links
  the track rod
  the spring or damping unit
and which have at least two in each case formed-on connection points for the connection of the axle bracket on the bodywork.

Here—viewed in the direction of travel—one of the connection points for connection to the bodywork is provided in front and one behind the transverse carrier.

Each of the consoles here has a formed-on receiving sleeve for the transverse carrier, which is constructed as a hollow profile. The profile can advantageously be a box profile and the receiving sleeve for the transverse carrier is adapted to the outer contour thereof, so that the transverse carrier can be inserted into this receiving sleeve and can be welded to the console. The receiving sleeves and the transverse carrier may also, however, be welded flush against each other.

The console can be produced here in a particularly advantageous manner from light metal, in particular from an Al alloy and produced as a pressure die casting. Such a console can be produced particularly simply and at a favourable cost and also so as to be distortion-free, wherein the old connection points and the sleeve for the transverse carrier can be constructed in one piece with the console.

The receiving sleeve for the transverse carrier can be adapted to the outer contour thereof and namely such that they can encompass the transverse carrier, so that the transverse carrier can be introduced and welded. The transverse carrier can, however, also be welded flush onto the correspondingly constructed receiving region.

The connection points—those situated at the front in the direction of travel and those situated at the rear in the direction of travel—for connection of the assembled axle bracket to the bodywork can be constructed in the manner of a sleeve (round), with an axis lying at least approximately perpendicularly to the roadway, wherein the receiving of the axle bracket via the sleeve-like components can take place via rubber bearings.

The rigidity of the axle bracket can be increased considerably when over the receiving sleeve for the transverse carrier on the side facing away from the roadway side thereof, an attachment is formed on, provided with reinforcement ribs, which forms the connection point for the suspension and/or the damping.

For the upper and the lower transverse carrier, in each case two connection points are provided on the console—a first and a second, one of which is provided in front of the transverse carrier, viewed in the direction of travel, and one behind the transverse carrier. Here, the connection points are respectively formed by two fastening points which—viewed in the direction of travel—lie one behind the other, namely
  for the one, front connection point and the other, rear connection point for the upper transverse link,
  for the one, front connection point and the other, rear connection point for the lower transverse link,
  for the connection point for the track rod,
  for the connection point for the spring- or damper unit. It is particularly advantageous here if of the two connection points for the upper transverse link in each case a fastening point is provided on both sides of the attachment or at least partially within the contours of the attachment and in each case a fastening point respectively is adjacent to one of the connection points of the console to the bodywork. For the lower transverse link in each case a fastening point can be arranged adjacent to the lower corner regions of the receiving sleeve for the transverse link and the two further ones for the lower transverse link can be spaced apart from the lower corner regions of the receiving sleeve for the transverse carrier.

To further increase the reinforcement, it can be advantageous if at least one of the bodywork connection points, i.e. the fastening point for example constructed as a sleeve, is connected via a reinforcement rib with the box-shaped attachment. Expediently, both bodywork connection sleeves are connected with each other with the box-shaped attachment respectively with such a reinforcement rib of flat construction. It is expedient here if the reinforcement rib runs at least approximately from the upper region of the box-shaped attachment to the upper region of the connection sleeve.

An optimum development with regard to strength and also rigidity is further produced when at least individual of the fastening points are formed by sleeves running at least approximately transversely to the direction of travel, through which for example screws can be guided for fastening the corresponding units, wherein on one side of the fastening point, constructed in the manner of a sleeve, the units rest, and on the other side the head of a screw or a nut lies.

It is, furthermore, particularly advantageous if reinforcement ribs run from the contours, such as end or corner contours of the sleeve-like receiving region for the transverse carrier to the individual fastening points and if, in addition, reinforcement ribs originate from the lower regions of the bodywork connection sleeves, around the console and expediently run into the fastening regions, constructed in the manner of a sleeve, or are at least tangent to these and in particular connect those for the lower transverse carrier with each other.

Further advantageous developments according to the invention will be apparent from the drawings in connection with the description thereof.

The invention is described in further detail by means of FIGS. 1 to 5:

Here, FIG. 1 shows the axle bracket I for a non-driven rear axle. The axle bracket consists of a profiled transverse carrier 1 and the controls 2 and 3 fastened to its end regions, wherein the console 2 is the right console and console 3 is the left. The direction of travel is marked by the arrow FR. The left console 3 is equipped with diagrammatically illustrated units, wherein the lower transverse link 4 is marked by 4, the track rod with 5, the upper transverse link with 6 and the spring-damper unit with 7.

Figure 1:
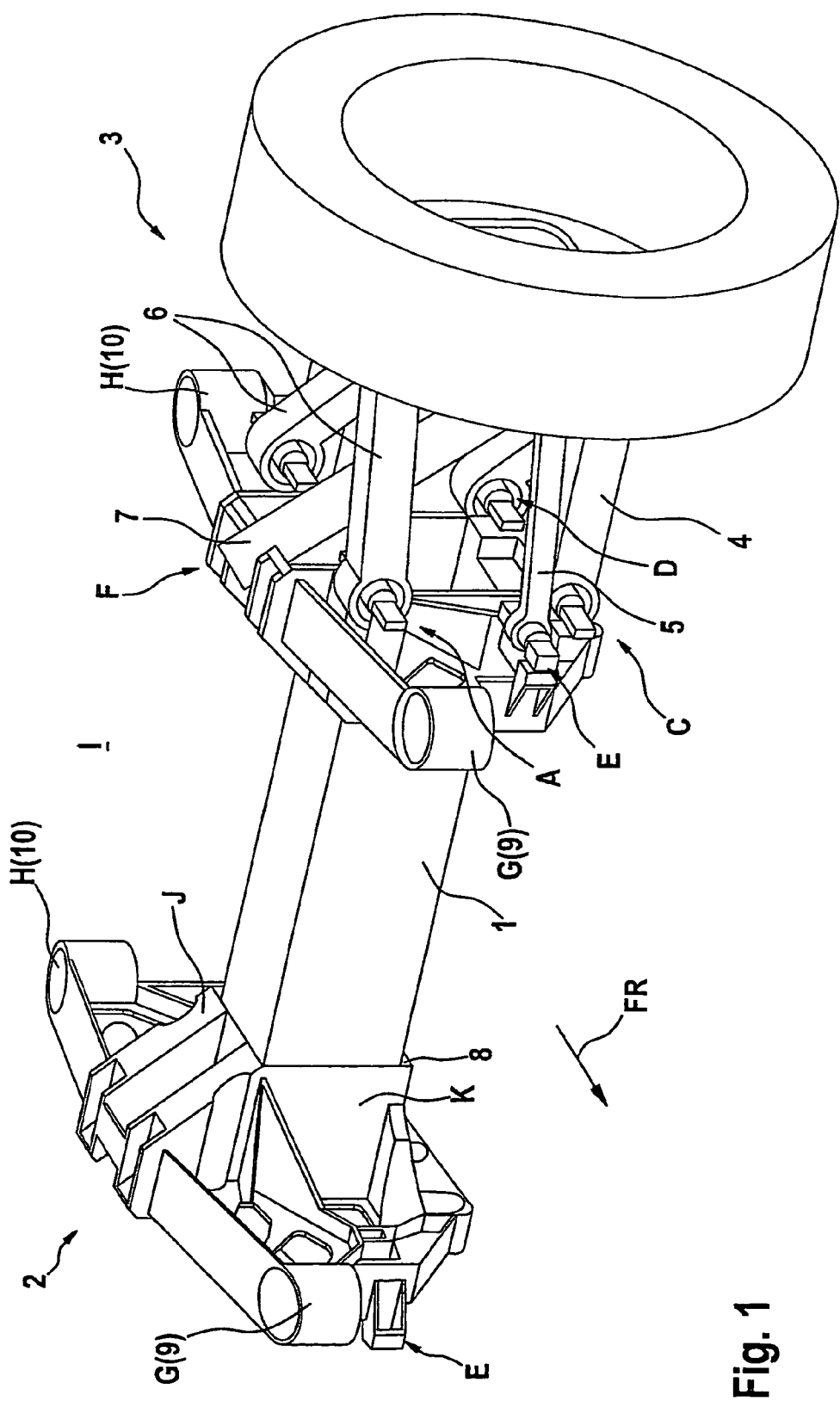

The brackets 2,3 have respectively formed-on connection points A,B for the upper transverse link 6, C,D for the lower transverse link 4, E for the track rod 5, F for the spring- or damping unit 7 and—viewed in direction of travel FR—connection points G and H, provided in front of and behind the transverse carrier 1, for the connection of the axle bracket I to the bodywork.

Furthermore, each console has a receiving sleeve K, constructed as a box hollow profile, for the transverse carrier 1. The receiving sleeve K for the transverse carrier 1 is adapted to the outer contour of the transverse carrier and is connected therewith via a weld seam 8.

The transverse carrier of the present invention is produced from light metal, in particular an Al alloy, likewise the consoles, which can be produced particularly advantageously by a pressure die casting process.

The connection points G and H for connecting the axle bracket to the bodywork are constructed as sleeves 9, 10 with an axis lying at least approximately perpendicularly to the roadway, and particularly advantageously, rubber bearings can be held in these sleeves 9, 10, by which a particularly efficient and simple connection of the axle bracket to the bodywork can take place.

On the side of the receiving sleeve K facing away from the roadway side, an attachment J is formed, consisting of reinforcement ribs 11-14 and reinforcement surfaces 15, to form the connection F for the spring-damper 7.

For each of the connection points A and B for the upper transverse link 6 and C and D for the lower transverse link 4, respectively two fastening points—respectively a front one and a rear one, viewed in the direction of travel—are provided, and namely fastening points A1 and A2 and B1 and B2 for the upper transverse link and fastening points C1 and C2 and D1 and D2 for the lower transverse link. Likewise, for the track rod connection point E respectively a front and a rear fastening point E1,E2 is provided, likewise for the connection point F for the spring-damper a front fastening point F1 and a rear F2.

Figure 2:
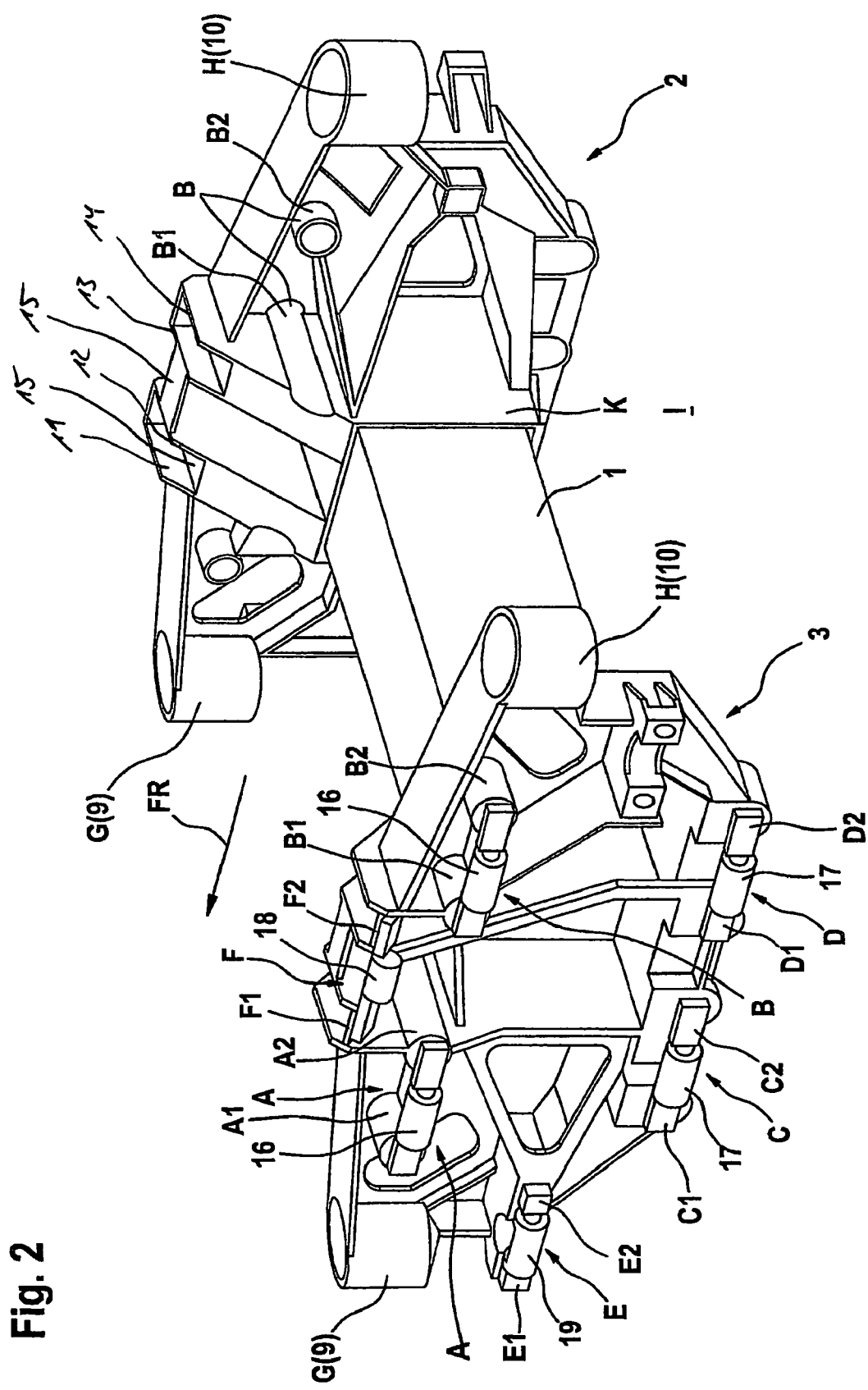
FIG. 2 shows the axle bracket I in a view with a direction of travel corresponding to the arrow FR which is drawn there.
Figure 3:
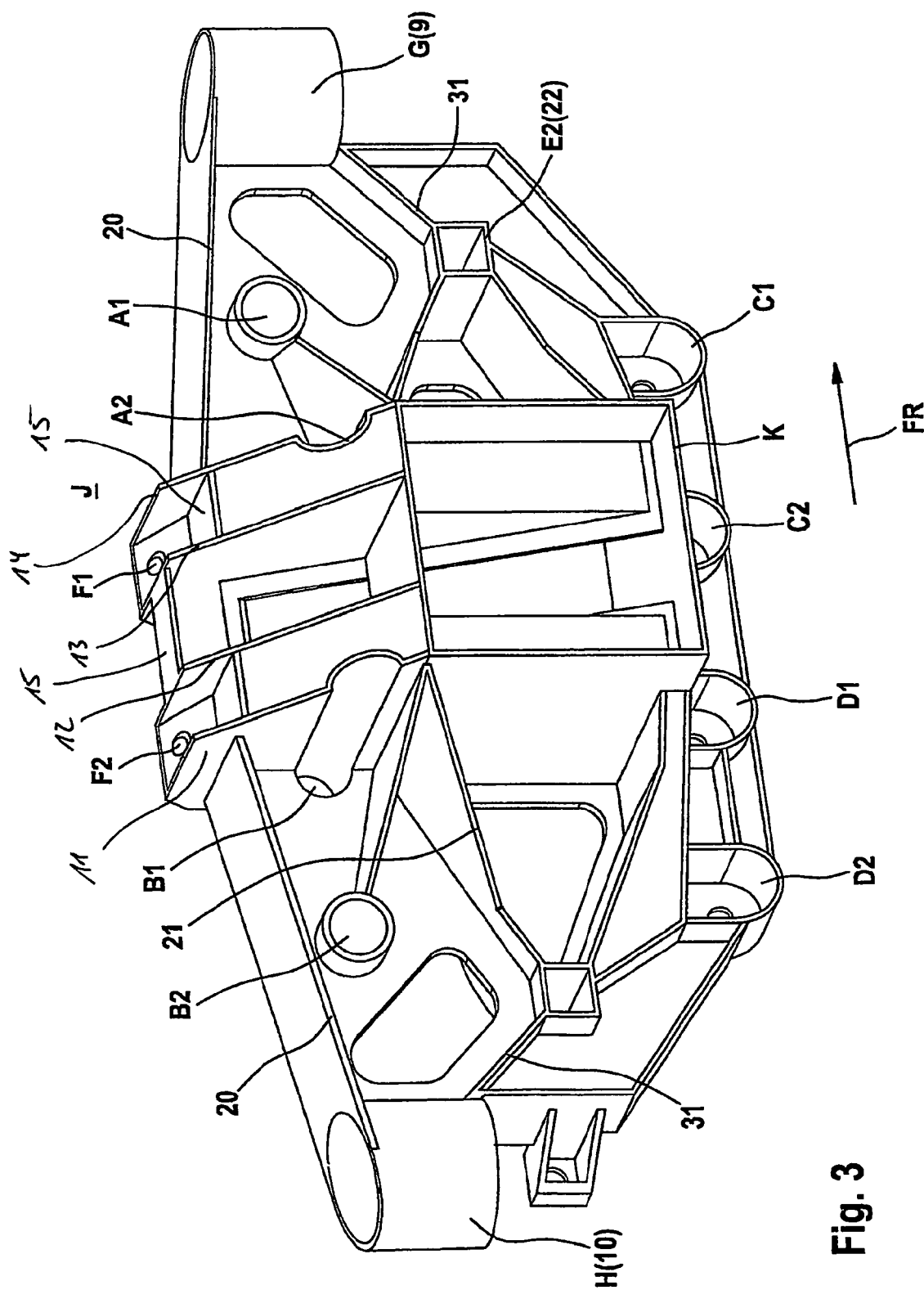
FIGS. 3 to 5 show respectively the left console 3 from different directions of view with respectively the direction of travel marked by the arrows FR.
Figure 4:
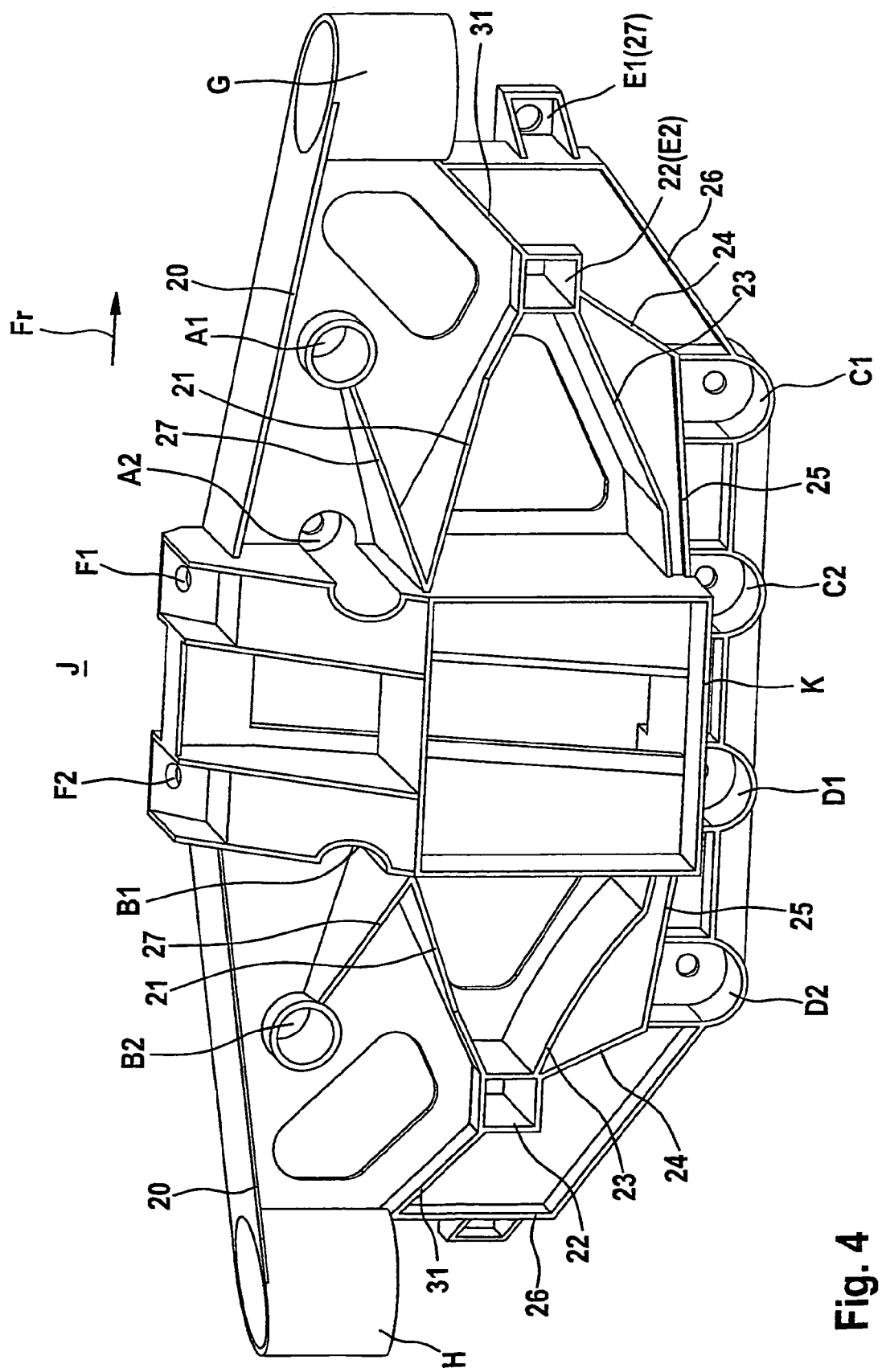
Figure 5:
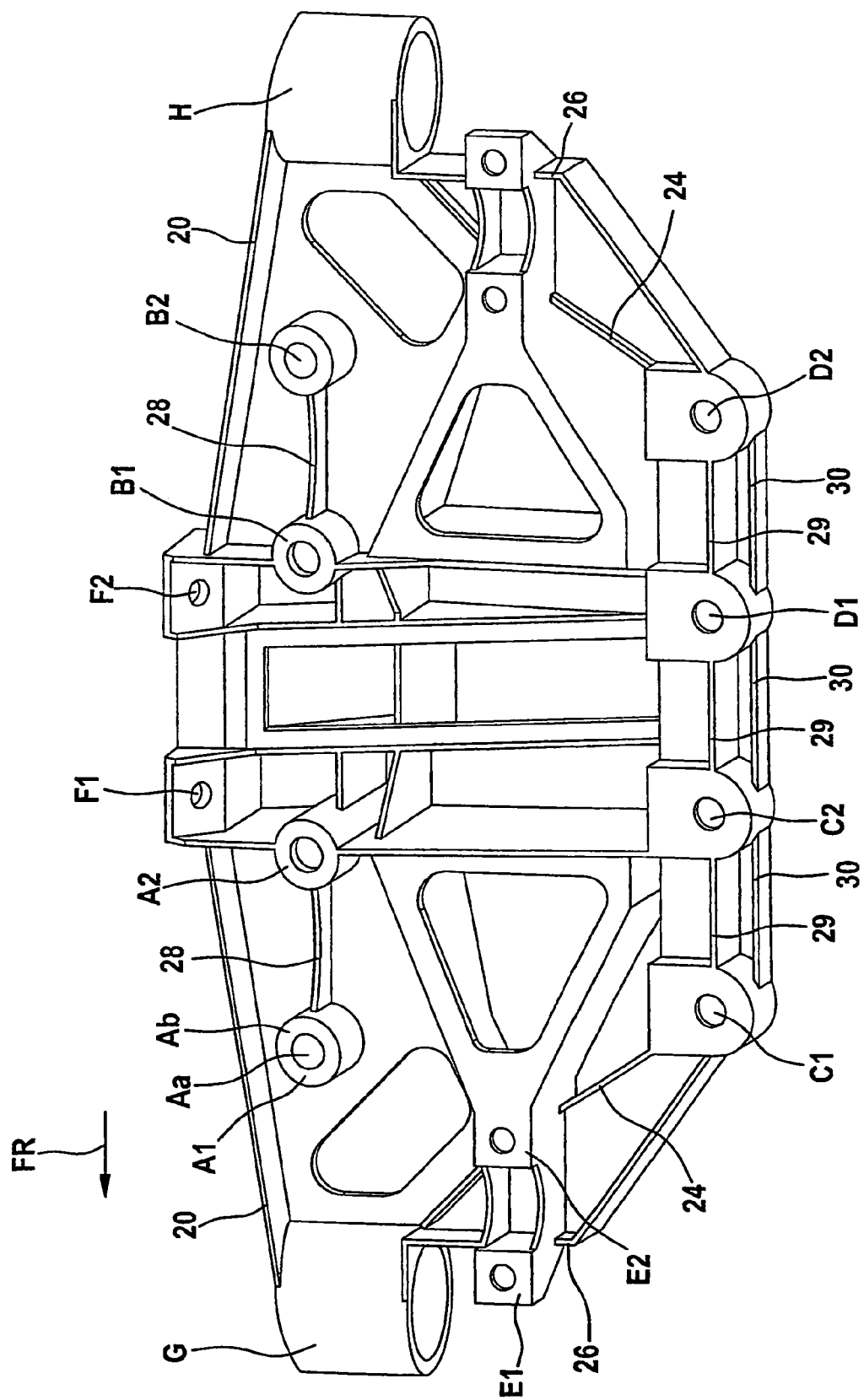

As can be seen in connection with FIG. 2, so-called claw joints 16 to 19 are provided for the connection of the above-mentioned units.

As can be seen in particular in connection with FIGS. 2 to 5, of the connection points A,B for the upper transverse link 6, the two fastening points A2 and B1 are adjacent to the attachment J or are even partially contained in the attachment J. The other connection points A1 and B2 are provided on the side facing away from the attachment J and face the bodywork fastening points G and H or the sleeves 9,10.

Of the connection points C,D for the lower transverse link 4, the two fastening points C2 and D1 are associated with the lower corner regions of the receiving sleeve K for the transverse carrier 1.

Of the connection points C and D for the lower transverse link 4, the further two fastening points C1 and D2 are distant from the corner regions of the receiving sleeve K.

The connection points G,H are connected with the box-shaped attachment J via respectively a flat reinforcement rib 20, running from the upper region of the box-shaped attachment J to the upper region of the sleeves 9 to 10.

The fastening points A1,A2,B1,B2,C1,C2 and D1 and D2 are formed by sleeve stubs or sleeve extensions running transversely to the direction of travel, which are closed off on the side facing the units 4 and 6 by cover bases or bearing surfaces interrupted by through-openings. As a representative of the others, only the through-bore Aa and the base Ab are marked.

A flat reinforcement rib 21 runs respectively from the upper corner regions of the receiving sleeve J for the transverse carrier 1 in the direction of the sleeves G and H towards a casting node 22 which is formed as a box sleeve transversely to the direction of travel.

A respectively flat reinforcement rib 23 runs from the sleeve-like node 22 to the lower region of the receiving sleeve K for the transverse carrier.

A further flat reinforcement rib 24 runs respectively from the node 22 to the fastening points C1 and C2. A further reinforcement rib 25 runs from the fastening points C2 and D1 adjacent to the lower corner regions of the receiving sleeve K for the transverse carrier and the fastening points C1 and C2 distant from the lower regions of the sleeve 1.

A further reinforcement rib 26 runs respectively from the lower region of the sleeves G and H to the bodywork connection, past the node 22, to the fastening points C2 and C1 for the lower transverse link which are distant from the lower corner regions of the sleeve 1 for the transverse carrier.

A further reinforcement rib 27 runs respectively from the upper corner region of the receiving sleeve K to the fastening point A1B2, spaced apart from the attachment J, for the upper transverse link.

The node 22 lying respectively at the front in the direction of travel serves respectively as the rear fastening point E2 for the fastening of the track rod. The other node 22, i.e. the rear node viewed in the direction of travel, is not occupied; it arises because the consoles 2 and 3 are mirror-inverted parts, in order to be able to be produced in one and the same tool.

The other fastening point, i.e. the fastening point E1 lying in the front in the direction of travel, for the track rod is formed as an extension 27 on the side of the reinforcement rib 26 facing away from the receiving sleeve K for the transverse carrier. The sleeve 22 or the casting node 22 is likewise covered on the side facing the track rod by a base which is interrupted by a through-bore.

Further reinforcement ribs 28 are provided between the fastening points A1 and A2 and B1 and B2.

Reinforcement ribs 29, at least approximately in the region of the through-openings of the supports C1 and C2 and D1 and D2, connect these supports or fastening points. Reinforcement ribs 30 at the lower outer region of the consoles connect the fastening points C1,C2; D1,D2 with each other. A reinforcement rib 31 respectively connects the node 22 with the lower region of the sleeves G and H.

LIST OF REFERENCE NUMBERS

Is Part of the Description

I axle bracket
FR direction of travel
1 transverse carrier
2 console—right
3 console—left
4 transverse link—bottom
5 track rod
6 transverse link—top
7 spring-damper unit
A front connection point of upper transverse links
B rear connection of point of upper transverse links
C front connection point of lower transverse links
D rear connection point of lower transverse links
E connection point for track rod
F connection point spring/damper unit
G connection point bodywork—front
H connection point bodywork—rear
K receiving sleeve
8 weld seam
9,10 sleeves
J attachment
11-14 reinforcement ribs
15 reinforcement surfaces
16-19 claw joints
A1,A2;B1,B2;C1,C2;D1,D2;E1,E2;F1,F2 fastening points
20 reinforcement rib
21 reinforcement rib
22 casting node
23 reinforcement rib
24 reinforcement rib
25 reinforcement rib
26 reinforcement rib
27 extension
28 reinforcement ribs
29 reinforcement ribs
30 reinforcement ribs
31 reinforcement ribs

The invention claimed is:

1. An axle bracket for a rear axle of a motor vehicle, the axle bracket being an assembled structural unit and comprising:
a single profiled transverse carrier;
a first console fastened at a first end region of the profiled transverse carrier; and
a second console fastened at a second end region of the profiled transverse carrier;
wherein the first console and the second console are provided respectively with first formed-on connection points for at least three units selected from the following group:
upper transverse links;
lower transverse links;
a track rod; and
a spring or a damping unit;
wherein the first console and the second console respectively have at least two second formed-on connection points for connecting the axle bracket to bodywork; and
wherein the first and second formed-on connection points are formed on the first and second consoles in one piece.

2. The axle bracket according to claim 1, wherein—viewed in a direction of travel—a front connection point of the at least two second formed-on connection points for connecting the axle bracket to the bodywork is provided in front of the profiled transverse carrier and a back connection point of the at least two second formed-on connection points is provided behind the profiled transverse carrier.

3. The axle bracket according to claim 1, wherein at least one of the first console and the second console has a receiving sleeve for the profiled transverse carrier.

4. The axle bracket according to claim 3, wherein the receiving sleeve for the profiled transverse carrier is an attachment adapted to an outer contour of the profiled transverse carrier.

5. The axle bracket according to claim 3, further comprising a box-shaped attachment in a region of the receiving sleeve and provided on a side of the receiving sleeve facing away from a roadway;
wherein the box-shaped attachment is provided with reinforcement ribs.

6. The axle bracket according to claim 5, wherein the box-shaped attachment has a spring connection point of the first formed-on connection points; and
wherein the spring connection point is for a spring or a damping unit.

7. The axle bracket according to claim 5, wherein the at least one of the first console and the second console is provided with a front upper formed-on connection point of the first formed-on connection points and with a rear upper formed-on connection point of the first formed-on connection points, the front and rear upper formed-on connection points being for an upper transverse link;
wherein the front upper formed-on connection point comprises a first front upper fastening point and a second front upper fastening point;
wherein the rear upper formed-on connection point comprises a first rear upper fastening point and a second rear upper fastening point; and
wherein the second front upper fastening point and the first rear upper fastening point are at least adjacent to the box-shaped attachment.

8. The axle bracket according to claim 5, wherein at least one of the at least two second formed-on connection points of the at least one of the first and second consoles is connected with the box-shaped attachment via a reinforcement rib of the reinforcement ribs.

9. The axle bracket according to claim 8, wherein the reinforcement rib is flat.

10. The axle bracket according to claim 8, wherein the at least two second formed-on connection points of the at least one of the first and second consoles are sleeves having a respective axis lying at least approximately perpendicularly to a roadway; and
wherein the reinforcement rib runs at least approximately from an upper region of the box-shaped attachment to an upper region of a first sleeve of the sleeves having the respective axis.

11. The axle bracket according to claim 5, wherein the at least one of the first console and the second console is provided with a front upper formed-on connection point of the first formed-on connection points, the front upper formed-on connection point being for an upper transverse link and comprising a first front upper fastening point and a second front upper fastening point;
wherein the first front upper fastening point is spaced apart from the box-shaped attachment; and
wherein a reinforcement rib runs from an upper corner region of the receiving sleeve for the profiled transverse carrier to the first front upper fastening point.

12. The axle bracket according to claim 3, wherein the at least one of the first console and the second console is provided with a front lower formed-on connection point of the first formed-on connection points and with a rear lower formed-on connection point of the first formed-on connection points, the front and rear lower formed-on connection points being for a lower transverse link;
  wherein the front lower formed-on connection point comprises a first front lower fastening point and a second front lower fastening point;
  wherein the rear lower formed-on connection point comprises a first rear lower fastening point and a second rear lower fastening point; and
  wherein the second front lower fastening point and the first rear lower fastening point are adjacent to lower corner regions of the receiving sleeve for the profiled transverse carrier.

13. The axle bracket according to claim 12, wherein a reinforcement rib runs from the first rear lower fastening point to the second rear lower fastening point.

14. The axle bracket according to claim 3, wherein the at least one of the first console and the second console is provided with a front lower formed-on connection point of the first formed-on connection points and with a rear lower formed-on connection point of the first formed-on connection points, the front and rear lower formed-on connection points being for a lower transverse link;
  wherein the front lower formed-on connection point comprises a first front lower fastening point and a second front lower fastening point;
  wherein the rear lower formed-on connection point comprises a first rear lower fastening point and a second rear lower fastening point; and
  wherein the first front lower fastening point and the second rear lower fastening point are spaced apart from corner regions of the receiving sleeve for the profiled transverse carrier.

15. The axle bracket according to claim 14, wherein the at least one console of the first and second consoles further comprises a node constructed as a node sleeve, the node having a node axis lying at least approximately transversely to a direction of travel; and
  wherein a first flat reinforcement rib runs from the node to the first front lower fastening point.

16. The axle bracket according to claim 15, wherein the at least two second formed-on connection points of the at least one of the first and second consoles are sleeves having a respective axis lying at least approximately perpendicularly to a roadway; and
  wherein a second reinforcement rib runs from a lower region of a first sleeve of the sleeves having the respective axis, past the node, to the first front lower fastening point.

17. The axle bracket according to claim 16, wherein the at least one of the first console and the second console further comprises a track rod connection point of the first formed-on connection points;
  wherein the track rod connection point comprises a first track rod fastening point and a second track rod fastening point, the first track rod fastening point lying in front of the second track rod fastening point when viewed in the direction of travel;
  wherein the first track rod fastening point is formed as an extension on the second reinforcement rib; and
  wherein the first track rod fastening point faces away from the receiving sleeve for the profiled transverse carrier.

18. The axle bracket according to claim 3, wherein the at least one of the first and second consoles further comprises a node constructed as a nose sleeve and having a node axis lying at least approximately transversely to a direction of travel;
  wherein the at least two second formed-on connection points of the at least one of the first and second consoles are sleeves having a respective axis lying at least approximately perpendicularly to a roadway; and
  wherein a first flat reinforcement rib runs from an upper corner region of the receiving sleeve for the profiled transverse carrier in a direction of a first sleeve of the sleeves having the respective axis, up to the node.

19. The axle bracket according to claim 18, wherein a second flat reinforcement rib runs from the node to a lower region of the receiving sleeve for the profiled transverse carrier.

20. The axle bracket according to claim 18, wherein the at least one of the first console and the second console further comprises a track rod connection point of the first formed-on connection points;
  wherein the track rod connection point comprises a first track rod fastening point and a second track rod fastening point, the first track rod fastening point lying in front of the second track rod fastening point when viewed in a direction of travel;
  wherein the node serves as the second track rod fastening point; and
  wherein the second track rod fastening point faces the receiving sleeve for the profiled transverse carrier.

21. The axle bracket according to claim 1, wherein the profiled transverse carrier is a hollow profile.

22. The axle bracket according to claim 21, wherein the profiled transverse carrier is a box profile.

23. The axle bracket according to claim 1, wherein the first and second consoles are welded to the profiled transverse carrier.

24. The axle bracket according to claim 1, wherein the profiled transverse carrier comprises an Al alloy.

25. The axle bracket according to claim 1, wherein the first and second consoles comprise an Al alloy.

26. The axle bracket according to claim 25, wherein the first and second consoles are pressure die castings.

27. The axle bracket according to claim 1, wherein the at least two second formed-on connection points of the first console are sleeves having a respective axis lying at least approximately perpendicularly to a roadway.

28. The axle bracket according to claim 27, wherein the sleeves serve to receive rubber bearings.

29. The axle bracket according to claim 1, wherein at least one of the first console and the second console is provided with a front upper formed-on connection point of the first formed-on connection points and a rear upper formed-on connection point of the first formed-on connection points, the front and rear upper formed-on connection points being for an upper transverse link;
  wherein the front upper connection point when viewed in a direction of travel lies in front of the rear upper connection point;
  wherein the at least one of the first console and the second console is provided with a front lower formed-on connection point of the first formed-on connection points and a rear lower formed-on connection point of the first formed-on connection points, the front and rear lower formed-on connection points being for a lower transverse link; and
  wherein the front lower connection point when viewed in the direction of travel lies in front of the rear lower connection point.

30. The axle bracket according to claim 29, wherein the at least one of the first console and the second console is further provided with a track rod connection point of the first formed-on connection points, and a spring connection point of the first formed-on connection points, the track rod connection point being for a track rod, and the spring connection point being for a spring or damping unit;

wherein the front upper formed-on connection point comprises a first front upper fastening point and a second front upper formed on fastening point, the first front upper fastening point lying in point when viewed in the direction of travel;

wherein the rear upper formed-on connection point comprises a first rear upper fastening point and a second rear upper fastening point, the first rear upper fastening point lying in front of the second rear upper fastening point when viewed in the direction of travel;

wherein the front lower formed-on connection point comprises a first front lower fastening point and a second front lower fastening point, the first front lower fastening point lying in front of the second front lower fastening point when viewed in the direction of travel;

wherein the rear lower formed-on connection point comprises a first rear lower fastening point and a second rear lower fastening point, the first rear lower fastening point lying in front of the second rear lower fastening point when viewed in the direction of travel;

wherein the track rod connection point comprises a first track rod fastening point and a second track rod fastening point, the first track rod fastening point lying in front of the second track rod fastening point when viewed in the direction of travel; and wherein the spring connection point comprises a first spring fastening point and a second spring fastening point, the first spring fastening point lying in front of the second spring fastening point when viewed in the direction of travel.

31. The axle bracket according to claim 30, wherein the first front upper fastening point, the second front upper fastening point, the first rear upper fastening point, the second rear upper fastening point, the first front lower fastening point, the second front lower fastening point, the first rear lower fastening point, the second rear lower fastening point, the first track rod fastening point, the second track rod fastening point, the first spring fastening point, and the second spring fastening point are formed by sleeve-stubs in the at least one of the first and second consoles, the sleeve-stubs running at least approximately transversely to the direction of travel.

32. The axle bracket according to claim 1, wherein at least one of the first console and the second console is provided with a front upper formed-on connection point of the first formed-on connection points and with a rear upper formed-on connection point of the first formed-on connection points, the front and rear upper formed-on connection points being for an upper transverse link;

wherein the front upper formed-on connection point comprises a first front upper fastening point and a second front upper fastening point;

wherein the rear upper formed-on connection point comprises a first rear upper fastening point and a second rear upper fastening point; and wherein the second front upper fastening point and the first rear upper fastening point are respectively adjacent to one of the at least two second formed-on connection points of the at least one of the first and second consoles.

* * * * *

UNITED STATES PATENT AND TRADEMARK OFFICE
CERTIFICATE OF CORRECTION

PATENT NO. : 8,132,821 B2  
APPLICATION NO. : 12/448334  
DATED : March 13, 2012  
INVENTOR(S) : Buschjohann et al.

It is certified that error appears in the above-identified patent and that said Letters Patent is hereby corrected as shown below:

Column 9, line 8 (Line 17 of Claim 30) after "in" (first occurrence) please insert the following:
--front of the second front upper fastening--.

Signed and Sealed this
First Day of January, 2013

David J. Kappos
*Director of the United States Patent and Trademark Office*